May 30, 1944.  E. J. DAHLSTROM  2,350,152
WAX APPLICATOR
Filed May 26, 1943  2 Sheets-Sheet 1
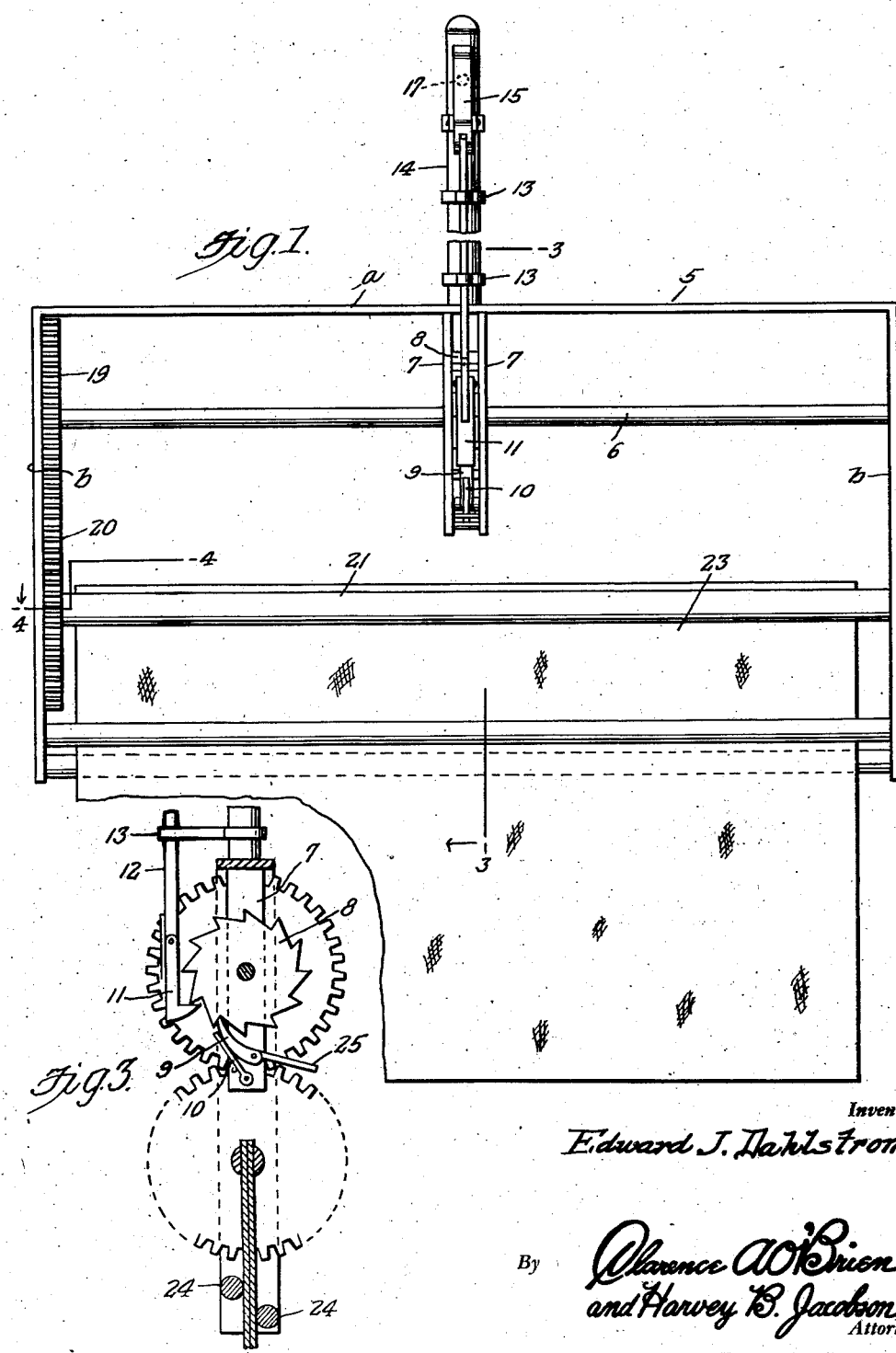
Inventor
Edward J. Dahlstrom
By Clarence A. O'Brien
and Harvey B. Jacobson
Attorneys

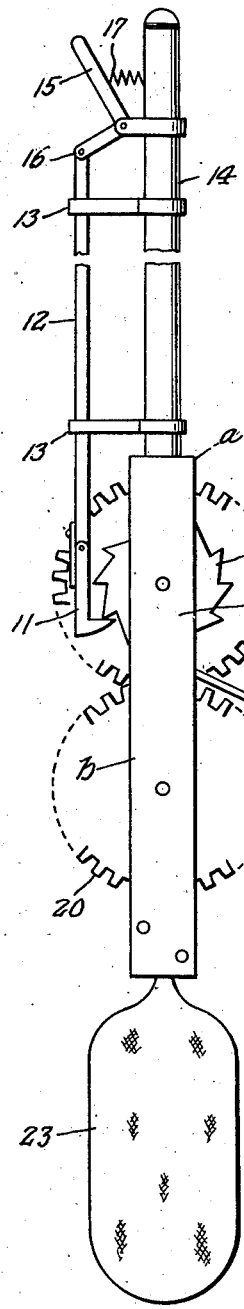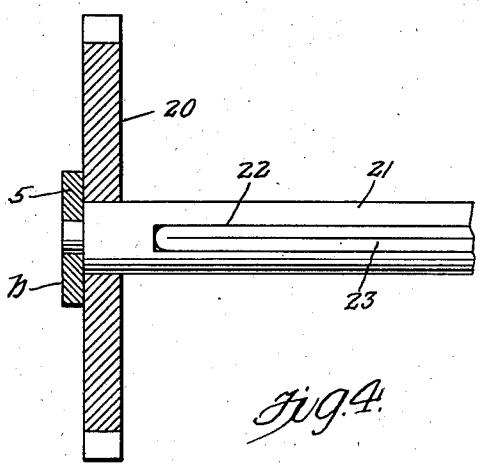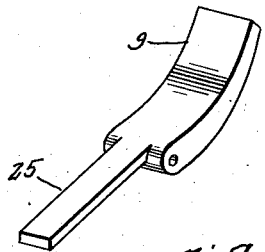

Patented May 30, 1944

2,350,152

UNITED STATES PATENT OFFICE 2,350,152

WAX APPLICATOR

Edward J. Dahlstrom, San Francisco, Calif.

Application May 26, 1943, Serial No. 488,620

6 Claims. (Cl. 91—39)

This invention relates to new and useful improvements in wax applicators such as are used in waxing floors and the like.

The principal object of the present invention is to provide a wax applicator which includes a wax pervious bag from which wax can be mechanically extruded as requirement demands.

Another important object of the invention is to provide a waxer which can be easily handled and which will save considerable time in use.

Other objects and advantages of the invention will become apparent to the reader of the following description.

In the drawings:

Figure 1 is a fragmentary front elevational view of the device.

Figure 2 is a fragmentary side elevational view of the device.

Figure 3 is a fragmentary enlarged detailed sectional view on the line 3—3 of Figure 1.

Figure 4 is a fragmentary detailed sectional view taken substantially on the line 4—4 of Figure 1.

Figure 5 is a perspective view of the holding dog.

Referring to the drawings wherein like numerals designate like parts, it can be seen that numeral 5 denotes a U-shaped frame having a horizontal bar a, and depending legs b, b.

Between the legs b, b is mounted a shaft 6 which is journaled through a pair of intermediately located closely spaced parallel bars 7, 7 which project downwardly from the horizontal bar a.

Between the bars 7, 7 and suitably secured to the shaft 6, is a ratchet wheel 8 with which engages a holding dog 9, held in place against the teeth of the ratchet wheel 8 by spring 10.

Numeral 11 denotes a pivotal pawl carried by the lower end of a slide rod 12, this slide rod being slidably disposed through guides 13, 13 on an elongated handle 14 which projects upwardly from the cross bar a of the frame 5. At the upper end of the handle 14 is a bell crank 15, one end of which is pivotally secured as at 16 to the upper end of the slide rod 12, while its other end serves as a handle and has a spring 17 interposed between itself and the handle 14 so as to normally urge the handle end of the bell crank 15 outwardly in order to maintain the pawl 11 in the position shown in Figure 2.

One end of the shaft 6 has a gear 19 which meshes with the gear 20 located on one end of a shaft 21 which has a slot 22 extending longitudinally therein from near one end to a point near the other end thereof, and this slot is intended for receiving the open end of a bag 23. The bag is preferably the fabric variety and the same passes between a pair of closely spaced rods 24, 24, near the free ends of the legs b, b.

It is to be understood that the bag 23 is first substantially filled with wax and its free end then disposed upwardly between the rods 24, 24. The dog 9 has a short arm 25 which when pulled upwardly releases the ratchet wheel 8, as when it is desirous to unwind the free end of the bag from the shaft 21. However, when it is desired to wind the bag 24 so as to compress the wax and cause extrusion of some of the same through the fabric of the bag, the dog 9 is left in the position shown in Figure 3, while the bell crank 15 is actuated to cause an up and down movement of the pawl 11, which, of course, rotates the shaft 6 and in turn rotates the shaft 21, winding the open end of the bag onto the shaft 21 and compressing the wax within the bag exteriorly of the rods 24, 24. Obviously as the bag becomes somewhat slack due to the dispensation of wax therefrom, further action of the pawl 11 can be resorted to, as the bag is moved over the floor to be waxed.

While the foregoing specification sets forth the invention in specific terms, it is to be understood that numerous changes in the shape, size, and materials may be resorted to without departing from the spirit and scope of the invention as claimed hereinafter.

Having described the invention, what is claimed as new is:

1. A wax applicator comprising a frame, a handle for the frame, a flexible wax pervious bag for containing wax, a shaft on which the open end of the bag can be wound, compressing means through which the bag passes, and means on the frame for rotating the shaft and thereby drawing the bag through the compressing means.

2. A wax applicator comprising a frame, a handle for the frame, a flexible wax pervious bag for containing wax, a shaft on which the open end of the bag can be wound, means on the frame for rotating the shaft, and a pair of closely spaced abutment bars between which the upper portion of the bag is disposed and against which the wax containing portion of the bag can abut to express wax from the bag when the upper end of the bag is being wound on the shaft.

3. A wax applicator comprising a frame, a handle for the frame, a flexible wax pervious bag for containing wax, a shaft on which the open end of the bag can be wound, compressing members between which the bag passes, and means on the frame for rotating the shaft to draw the bag upwardly between the compressing members and thereby expelling wax from the bag, said shaft being formed with a longitudinal slot in which the open end of the bag is disposed to detachably connect the bag with the shaft.

4. A wax applicator comprising a frame, a handle for the frame, a flexible wax pervious bag for containing wax, a shaft on which the open upper end of the bag can be wound, bag compressing means carried by said frame under the shaft and through which the bag passes, and means on the frame for rotating the shaft, said means for rotating the shaft comprising a ratchet wheel, a dog for the ratchet wheel, said ratchet wheel being in driving relation with respect to the shaft, a slidable rod disposed longitudinally of the handle, a pawl at one end of the rod for engaging the ratchet wheel, and means at the opposite end of the rod and located on the handle for reciprocating the rod.

5. A wax applicator comprising a frame, a bag-carrying shaft extending horizontally in said frame and rotatably mounted, said shaft being formed with a longitudinally extending slot for receiving the upper portion of a bag, compressing rods mounted in said frame below said shaft in spaced relation to each other and between which the bag passes for compressing the bag and expelling wax therefrom as the shaft is rotated, a drive shaft rotatably mounted in said frame above the bag-carrying shaft and having geared connection with the bag-carrying shaft, a ratchet carried by said drive shaft, a handle extending upwardly from said frame, and actuating means carried by said handle and including a pawl for engaging the ratchet wheel and imparting step-by-step rotation to the drive shaft.

6. A wax applicator comprising a frame, compressing means in the lower portion of said frame and through which a bag containing wax passes, a bag-holding shaft rotatably mounted in said frame above the compressing means, a drive shaft rotatably mounted in the frame above the bag-holding shaft and geared thereto for transmitting rotary motion to the bag-holding shaft to wind the bag thereon and draw the bag upwardly to expel wax from the bag, a ratchet wheel carried by said drive shaft, a dog engaging said ratchet wheel, a handle extending upwardly from said frame, guides carried by said handle and spaced from each other longitudinally thereof, a rod slidable vertically through said guides, a pawl pivoted through the lower end of said rod for engaging said ratchet, and a bell crank lever carried by said handle and connected with the upper end of said rod for shifting the rod upwardly and imparting step-by-step rotation to the drive shaft.

EDWARD J. DAHLSTROM.